United States Patent [19]

Leopoldo

[11] Patent Number: 5,083,354
[45] Date of Patent: Jan. 28, 1992

[54] DEVICE FOR FITTING SEALS AUTOMATICALLY INTO THE SEATING GROOVES OF THERMOPLASTIC PIPE SOCKETS

[75] Inventor: Savioli Leopoldo, Alfonsine, Italy

[73] Assignee: S.I.C.A. Serrande, Infissi, Carpenteria, Attrezzatura S.p.A., Alfonsine (Ravenna), Italy

[21] Appl. No.: 585,300

[22] Filed: Sep. 19, 1990

[30] Foreign Application Priority Data

Sep. 22, 1989 [IT] Italy .................. 3628 A/89

[51] Int. Cl.⁵ .................................. B23P 19/02
[52] U.S. Cl. ................................... 29/235
[58] Field of Search ............... 29/235, 450, 451

[56] References Cited
U.S. PATENT DOCUMENTS

| | | |
|---|---|---|
| 3,553,817 | 1/1971 | Lallak ............... 29/235 |
| 3,851,369 | 12/1974 | Rockwell. | |
| 4,845,822 | 7/1989 | Hutson ............... 29/235 |

FOREIGN PATENT DOCUMENTS

| | | |
|---|---|---|
| 137907 | 9/1984 | European Pat. Off. . |
| 3710829 | 8/1987 | Fed. Rep. of Germany . |
| 3723091 | 4/1989 | Fed. Rep. of Germany . |
| 275549 | 3/1962 | Netherlands . |

*Primary Examiner*—Robert C. Watson
*Attorney, Agent, or Firm*—Dvorak and Traub

[57] ABSTRACT

A device (16) for seating seals (6) automatically in the grooves (14) afforded by the sockets (3) of plastic pipes (4) comprises a straight tubular element (1) offered immediately adjacent to and in alignment with the pipe socket (3) and serving to support and position a seal (6) of outer diameter greater than the internal diameter of the socket, a plunger (7) capable of sliding movement internally both of the tubular element and of the socket, by which a seal positioned in the tubular element is inserted into the groove (14), and actuators (10) by which the plunger is reciprocated automatically.

7 Claims, 1 Drawing Sheet

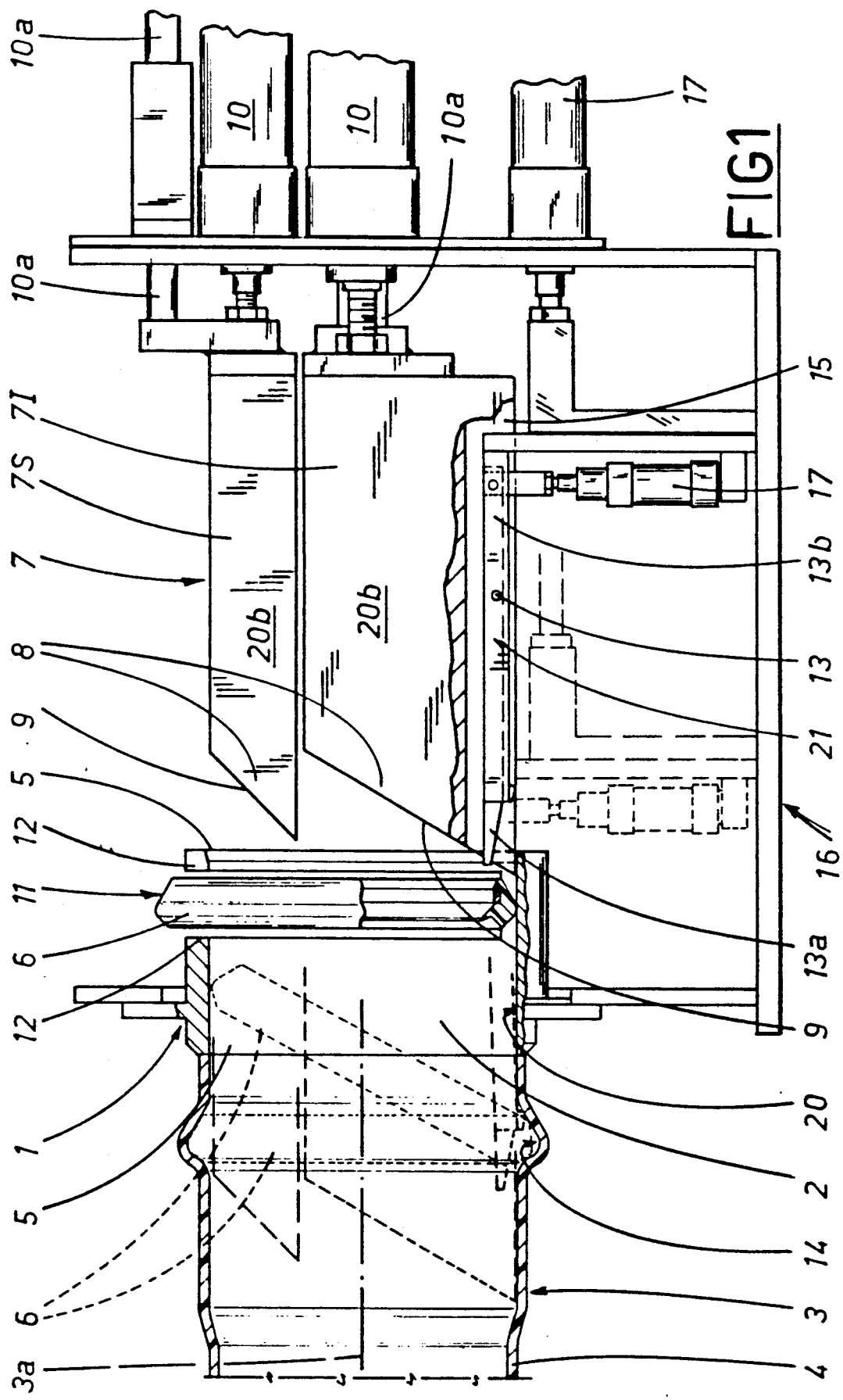

DEVICE FOR FITTING SEALS AUTOMATICALLY INTO THE SEATING GROOVES OF THERMOPLASTIC PIPE SOCKETS

SUMMARY OF THE INVENTION

The present invention relates to a device by means of which to seat seals automatically in the grooves afforded by the socket ends of thermoplastic pipes. Fluid conveying pipelines are frequently assembled from lengths of thermoplastic pipe insertable one into the next, one end of each length being formed into a socket and provided internally with seating grooves in which to accommodate seals preventing egress of the conveyed fluid. The seals in question are typically annular in shape, and seated in the formed socket of the pipe using conventional means which may vary in construction, but will invariably operate by exploiting the flexible properties of the material from which the seal is fashioned.

Departing from this premiss, all prior art methods utilize devices designed to effect a series of steps substantially comprising:

compression of the seal, in order to produce an annular configuration of reduced dimensions;

insertion of the compressed seal into the socket;

alignment of the compressed seal with the seating groove and subsequent release of the compressive force, thereby occasioning the re-expansion of the seal and its permanent retention in the socket.

It will be clear enough that, regardless of their individual features of construction and operation, which are more or less advantageous according to the embodiment, all of these conventional devices betray the fundamental drawback of being unable to seat seals fashioned in non-flexible materials.

Devices of the type in question cannot therefore be used to fit seals fashioned from polypropylene, or flexible seals provided with plastic backup rings.

Accordingly, the object of the present invention is to overcome the basic drawback described above. The stated object is realized with a device as characterized in the appended claims, by which seals fashioned in any given type of material, i.e. including plastics, or seals fashioned in flexible materials but designed for use in conjunction with plastic backup rings, can be fitted automatically into the seating grooves of thermoplastic pipes.

A device embodied according to the invention thus affords the following advantages:

complete independence from the flexible properties of materials, hence the ability to handle and fit a seal fashioned from whatever material may be most suitable for its application, not least according to the physical and chemical nature of the conveyed fluids;

significantly low outlay on construction, given the performance obtainable;

great versatility of application, even within the compass of a single socket diameter, by virtue of the fact that on device can be utilized to seat seals of any given section in grooves of any given geometry;

easy operational control over the device itself, with the option of full automation: incorporating pneumatic and/or electrical automation technology, for example, all that is required from the operator is to depress a button to start the cycle;

notable durability both of working parts and of actuators, which are subject to the minimum of wear during operation;

total constructional flexibility in respect of the size and shape of pipe socket, achieved simply by embodying one of the working parts of the device with separable and independently actuated component sections.

BRIEF DESCRIPTION OF THE DRAWING

FIG. 1, illustrates a general side elevation with certain parts cut away better to reveal others.

DETAILED DESCRIPTION

With reference to the drawing denotes a device by means of which to fit seals 6 automatically into the seating grooves 14 afforded by the sockets 3 of thermoplastic pipes 4.

Such a device 16 essentially comprises:

a straight tubular element 1 offered immediately adjacent to and in alignment with the socket 3 of a pipe 4 and serving to support a seal 6 of external diameter greater than the internal diameter of the socket 3;

a plunger 7 capable of sliding movement within both the tubular element 1 and the socket 3, by which a seal 6 supported in the tubular element 1 is inserted into the seating groove 14;

means 10 by which to actuate the plunger 7 automatically.

The tubular element 1 affords an internal cavity 2 with a cylindrical wall 20 of diameter identical to that of the socket 3, which in addition to its two open ends 5 is also accessible through a peripheral slot 11 of which the two edges 12 are designed to support a single seal 6 standing upright in a plane transverse to the axis 3a of the socket and resting on the internal wall 20 of the cavity 2 at bottom. The forwardmost end 8 of the plunger 7 directed toward the tubular element 1 presents an angled frontal surface 9; moreover, the cross section of the forwardmost end 8 is shaped in such a way as to interfere geometrically with a seal 6 occupying the slot 11 of the tubular element.

In the preferred embodiment of the device 16 shown in the accompanying drawing, the forwardmost end 8 of the plunger 7 is cylindrical and exhibits an external diameter identical to the diameter of the cavity 2, such that on insertion of the plunger 7 into the cavity, this same cylindrical end 8 will physically encounter a seal 6 currently occupying the slot 11.

The plunger 7, actuated by automatic means 10 as aforementioned, reciprocates along a rectilinear trajectory coinciding substantially with the axis of alignment 3a between the tubular element 1 and the socket 3.

In a preferred embodiment, such automatic actuator means 10 might be embodied simply as pneumatic cylinders, operated in conjunction with parallel guide rods 10a by which any unwarranted angular movement of the plunger 7 is prevented.

The operation of the device 16 described thus far will best be appreciated by observing the steps which take place during passage of the plunger 7 along its trajectory, departing from an initial position, shown by the bold line of the drawing, in which the plunger 7 is positioned in alignment with but externally of the tubular element 1.

In a first stage of its forward stroke, the plunger 7 is moved away from the initial position toward the tubular element 1, and enters the cavity 2. On covering a short distance internally of the cavity 2, the angled surface 9 will impinge on the seal 6 and force it gradually forward until fully inside the cavity 2; needless to say, the seal 6 must necessarily assume an angled position in order to enable its insertion into the cavity 2, given its greater diametrical dimensions. Thereafter, with the plunger 7 continuing to advance, the seal 6 is forced further to the point where its leading edge encounters the profile of the seating groove 14 afforded by the socket 3. This same leading edge of the seal 6 now locates in the groove 14, thereby creating an obstacle to further translatory motion, with the result that the forwardmost end 8 of the still advancing plunger 7 begins to pass through the seal 6 and thus locks the arrested leading edge forcibly in the groove 14. As the plunger 7 drives further forward and the cylindrical end 8 continues to force through the seal 6, the seal itself will become seated to a progressively greater degree in the groove 14 and its angle of inclination will grow less and less pronounced. In effect, while the forwardmost end 8 of the plunger 7 exerts a frontal thrust, the lateral surface denoted 20b invests the seal 6 tangentially and works it by degrees into the groove 14.

Full insertion of the seal is accomplished once the angled surface 9 has passed completely beyond the groove 14 and the seal 6 has been worked completely into the relative profile.

In a more advantageous and comprehensive embodiment of the device, the plunger 7 comprises a lever 13, accommodated internally of a longitudinal chase 15 formed in the surface of the plunger and extending back from the farthest extremity of the forwardmost end 8, which is anchored to the plunger 7 itself in such a manner as to permit both of rotation about a pivot 21 and of sliding longitudinally in relation to the plunger 7.

The lever 13 is embodied with one end 13a formed as a seating element, and with its remaining end 13b connected to means 17 by which the lever itself is actuated prior to actuation of the plunger 7 as a whole. These further actuator means 17 enable the lever 13 both to pivot and to traverse in relation to the plunger 7 in such a way as to engage the seal 6 during the traverse movement and carry it forward by the leading edge through the tubular element 1, and by pivoting thereafter, to press the leading edge into the groove 14 in readiness for the full seating action performed by the plunger 7. It will be clear enough that the adoption of the lever 13 provides added positioning stability when locating the leading edge of the seal 6 in the groove 14 during this initial part of the seating operation.

To enable the insertion of seals 6 in sockets 3 of reduced axial dimensions, such as those afforded by pipes 4 incorporating bends, the plunger 7 can be embodied to advantage in a plurality of separable component sections, and in the particular example of FIG. 1, in two sections 7S and 7I which combine to exhibit the same external geometry as that of a one-piece plunger 7, but are slidable in relation to one another along a plane disposed parallel to the trajectory of the plunger 7. The component sections 7S and 7I can therefore be actuated independently in such a way as to perform all the functions of the plunger 7 described thus far, while requiring a minimum of axial clearance internally of the socket 3. In this instance, the two component sections 7S and 7I will be operated independently by the automatic actuator means 10, in such a way that the section 7S farthest removed from the lever 13 can be made to continue forward after movement of the other section 7I has already ceased.

I claim:

1. An automatic seal fitting device comprising:
   a substantially straight tubular element alignable with a socket of a pipe,
   said tubular element having a cylindrical internal cavity diameter matching an inside diameter of said socket,
   said tubular element having a peripheral slot disposed substantially perpendicular with respect to a longitudinal axis of said tubular element,
   said slot arranged and constructed to receive a seal having an outside diameter greater than the inside diameter of said socket and to position said seal substantially coincident with a plane perpendicular with respect to said longitudinal axis of said tubular element and resting on an internal wall of said internal cavity,
   a cylindrical plunger slidable within said tubular element and said socket, said plunger having a frontal surface engageable with the seal, said frontal surface substantially coincident with a plane disposed at an angle with respect to said longitudinal axis,
   plunger reciprocating means arranged and constructed to reciprocate said plunger in a direction parallel with said longitudinal axis, said plunger arranged and constructed to transport the seal into said internal cavity and to seat the seal in a seating groove of said pipe,
   whereby said plunger transports said seal at an angle along said internal cavity, locates the leading edge of the seal in said seating groove, retains the leading edge in said groove, and gradually inserts the remainder of the seal into said seating groove as said frontal surface of said plunger passes entirely past said seating groove and the seal.

2. A device according to claim 1, wherein an outside diameter of a forward end of said plunger is arranged and constructed to match an internal diameter of said cylindrical internal cavity and an internal diameter of said socket, said plunger having a lateral surface, whereby said lateral surface is arranged and constructed to insert said seal into said seating groove as said plunger passes into said socket.

3. A device according to claim 6, wherein said plunger comprises a first plunger part and a second plunger part, said first and said second parts together having an external geometry identical to said cylindrical plunger and being slidable with respect to each other in a direction parallel with a trajectory of said plunger, whereby said first and second parts are actuated to minimize axial internal socket clearance requirements of a forward end of said plunger.

4. A device according to claim 1, further comprising a lever pivotably and slidably associated with said plunger, and a forward end of said lever arranged and constructed to engage, transfer, and seat the seal in said groove.

5. A device according to claim 4, wherein said plunger has a longitudinal chase, said lever being disposed along said longitudinal chase.

6. A device according to claim 4, further comprising lever actuating means arranged and constructed to control said forward end of said lever to carry the seal into said groove of said tubular element.

7. A device according to claim 1, wherein said plunger comprises a plurality of plunger sections.

* * * * *